US012560877B2

(12) United States Patent
Aso

(10) Patent No.: US 12,560,877 B2
(45) Date of Patent: Feb. 24, 2026

(54) IMAGE FORMING APPARATUS DETERMINING A VOLTAGE-CURRENT CHARACTERISTIC OF AN APPLIED MEMBER

(71) Applicant: KONICA MINOLTA, INC., Tokyo (JP)

(72) Inventor: Hiromu Aso, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/931,345

(22) Filed: Oct. 30, 2024

(65) Prior Publication Data

US 2025/0155838 A1 May 15, 2025

(30) Foreign Application Priority Data

Nov. 14, 2023 (JP) ................................ 2023-193404

(51) Int. Cl.
*G03G 15/16* (2006.01)
*G03G 15/00* (2006.01)

(52) U.S. Cl.
CPC ....... *G03G 15/1675* (2013.01); *G03G 15/162* (2013.01); *G03G 15/80* (2013.01)

(58) Field of Classification Search
CPC ... G03G 15/1675; G03G 15/162; G03G 15/80
USPC .......................................................... 399/314
See application file for complete search history.

(56) References Cited

U.S. PATENT DOCUMENTS

2004/0165902 A1* 8/2004 Matsuura ........... G03G 15/1645 399/66
2020/0209785 A1* 7/2020 Matsuzaki ........... G03G 15/161
2020/0409291 A1* 12/2020 Minato .............. G03G 15/5037

FOREIGN PATENT DOCUMENTS

JP 2004-280069 A 10/2004

* cited by examiner

*Primary Examiner* — Quana Grainger
(74) *Attorney, Agent, or Firm* — LUCAS & MERCANTI, LLP

(57) ABSTRACT

An image forming apparatus includes a hardware processor that determines a first voltage-current characteristic of an applied member on the basis of a detected current or a detected voltage detected by a detector when an applier applies a voltage or a current at one or more levels, the hardware processor controlling a detection time or the number of times of detection for detecting a detected current or a detected voltage by applying a voltage or a current at a level according to the level of the voltage or the current to be applied.

13 Claims, 11 Drawing Sheets

| a1 |
|---|
| 5p |
| 35p |
| 60p |
| 90p |
| ... |

IMAGE FORMING APPARATUS DETERMINING A VOLTAGE-CURRENT CHARACTERISTIC OF AN APPLIED MEMBER

CROSS-REFERENCE TO RELATED APPLICATION

The entire disclosure of Japanese patent application No. 2023-193404, filed on Nov. 14, 2023, is incorporated herein by reference in its entirety.

BACKGROUND OF THE INVENTION

1. Technical Field

The present invention relates to an image forming apparatus, a determination method of a current-voltage characteristic of an applied member, and a non-transitory recording medium storing a computer readable control program.

2. Description of Related Art

In an electrophotographic image forming apparatus such as a printer or a copying machine, toner images of a plurality of colors are formed on a plurality of image bearing members such as photoreceptors. Next, the formed toner images are transferred onto an intermediate transfer belt by primary transfer rollers, superimposed one on another, and then transferred onto a sheet by a secondary transfer roller. Thereafter, the toner image is fixed under heat and pressure to obtain a sheet on which the toner image is formed.

The resistance of the transfer member such as the transfer roller or the intermediate transfer belt changes due to durability or changes according to ambient temperature and humidity. In order to appropriately control an appropriate transfer voltage to be applied in accordance with a change in the resistance of the transfer member, an image forming apparatus disclosed in Patent Literature 1 (Japanese Unexamined Patent Publication No. 2004-280069) performs the following control in order to calculate an applied voltage for outputting a desired current value to the transfer roller. Voltage control is performed by transfer PTVC control performed by constant voltage control, and a current value for one rotation of the transfer roller is detected in a state where an output current value is close to a desired current value to some extent. Then, an average of the voltages applied at that time is set as an applied voltage for outputting the desired current value.

However, in the technique disclosed in Patent Literature 1, since the current value is always detected for the same time, that is, for one rotation of the transfer roller, the detection time may not be appropriate.

That is, in the technique disclosed in Patent Literature 1, depending on the level of the voltage value, the detection time may be insufficient and stable detection may not be performed.

The present invention has been made in view of the above circumstances, and an object of the present invention is to determine a voltage-current characteristic (VI characteristic) of an applied member in a short time with high accuracy.

SUMMARY OF THE INVENTION

To achieve at least one of the abovementioned objects, according to an aspect of the present invention, a device reflecting one aspect of the present inventions comprises the followings.

An image forming apparatus forming an image by an electrophotographic process, the image forming apparatus including:

an applied member to which a voltage or a current is applied;

an applier that applies a voltage or a current to the applied member;

a detector that detects a detected current or a detected voltage obtained through the applied member when the applier applies a voltage or a current to the applied member; and a hardware processor that determines a first voltage-current characteristic of the applied member on the basis of a detected current or a detected voltage detected by the detector when the applier applies a voltage or a current at one or more levels, the hardware processor controlling a detection time or the number of times of detection for detecting a detected current or a detected voltage by applying the voltage or the current at each of the one or more levels according to the each of the one or more levels of the voltage or the current to be applied.

BRIEF DESCRIPTION OF THE DRAWINGS

The advantages and features provided by one or more embodiments of the present invention will be understood more fully from the following detailed description and the accompanying drawings. However, these are for the purposes of example only and are not intended to limit the present invention.

DETAILED DESCRIPTION

Figure 1:
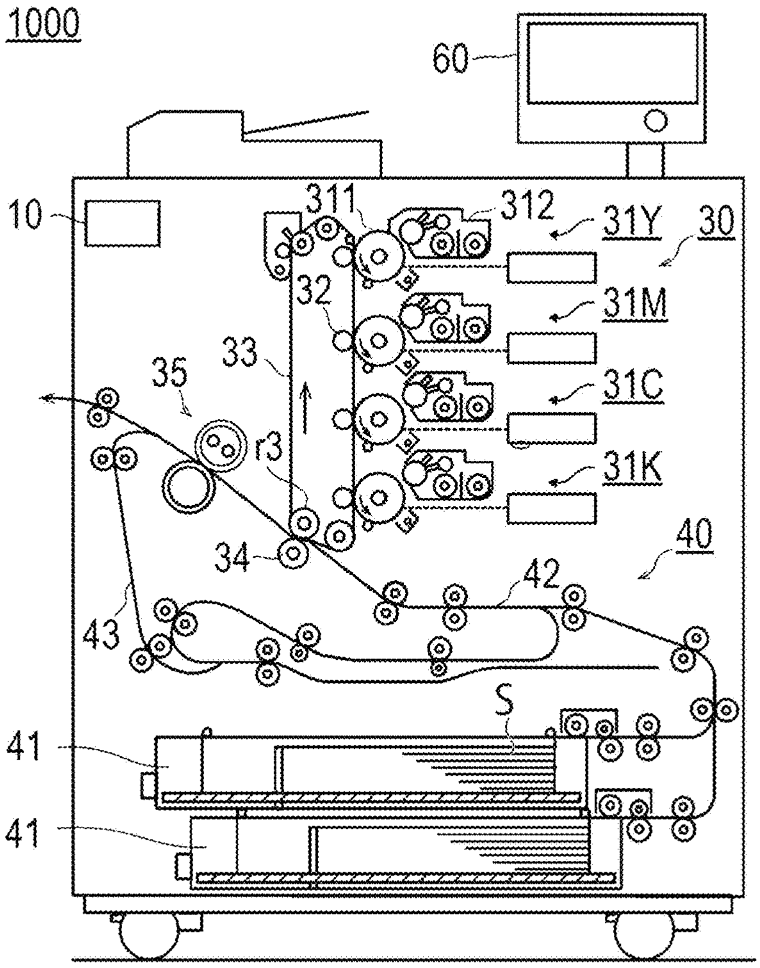
FIG. 1 is a diagram illustrating a schematic configuration of an image forming apparatus according to an embodiment of the present invention.

Hereinafter, embodiments of the present invention will be described with reference to the accompanying drawings. However, the scope of the present invention is not limited to the disclosed embodiments. Note that in the description of the drawings, the same components are denoted by the same reference signs, and redundant descriptions are omitted. In addition, dimensional ratios in the drawings are exaggerated for convenience of description and may be different from actual ratios.

(Applied Member, and Applied Voltage or Applied Current)

In the present embodiment, an applied member includes at least one of primary transfer members (primary transfer rollers 32Y, 32M, 32C, and 32K), a secondary transfer member (secondary transfer roller 34), or an intermediate transfer belt 33. Furthermore, the primary transfer rollers 32Y, 32M, 32C, and 32K, the secondary transfer roller 34, and the intermediate transfer belt 33 are also referred to as transfer members. In the following description, as a representative, a case where the primary transfer roller 32 is used as the applied member will be described as an example.

(Output Current Upon Application of Bias Voltage or Output Voltage Upon Application of Current)

Hereinafter, a case where a constant voltage power supply is used as a high-voltage power supply 81 of a bias applier 80 that outputs a bias to the applied member will be described as an example. For example, the high-voltage power supply 81 of the bias applier 80 that applies a transfer bias to a transfer target member is a constant voltage power supply. A controller 10 of an image forming apparatus 1000 obtains, from a current-voltage characteristic (hereinafter, also referred to as a VI characteristic), a transfer voltage (transfer voltage setting vt) at which a predetermined output current is obtained, and outputs the transfer voltage at the time of image formation. However, without being limited thereto, a constant current power supply may be applied as the high-voltage power supply 81 of the bias applier 80. For example, the high-voltage power supply 81 of the bias applier 80 that applies the transfer bias to the transfer target member is a constant current power supply, a transfer current (transfer current setting It) at which a predetermined output voltage is obtained is obtained from the VI characteristic, and the transfer current is output at the time of image formation.

(VI Characteristic, First and Second VI Characteristics)

In the present embodiment, the VI characteristic describes the relationship between the applied voltage to the applied member and the current flowing at that time, or the relationship between the applied current to the applied member and the voltage at that time. Determination of the VI characteristic of the applied member is performed by a VI characteristic determiner 120.

Although details will be described later, the first VI characteristic is a VI characteristic with a certain degree of high accuracy in a narrow range, and is the latest VI characteristic. The second VI characteristic (second voltage-current characteristic) is a wide-range and high-accuracy VI characteristic, and is a past VI characteristic.

Regarding the VI characteristic of the applied member, the entire shape (profile of the VI graph) does not change, but the resistance changes due to short-time use of the applied member or an environmental change, and thus the VI characteristic shifts. In the present embodiment, the entire shape is grasped by the second VI characteristic sampled at a low frequency, and the shift of the VI characteristic in a short time is compensated by the first VI characteristic sampled at a high frequency.

Determination of the "second VI characteristic" is performed at a timing at which an image is not formed (or immediately before an image is formed), taking a relatively long time. For example, determination of the "second VI characteristic" is performed immediately before the start of execution of a print job. When determining the second VI characteristic, the VI characteristic determiner 120 sequentially outputs applied voltages at many levels and detects currents flowing through the applied member at that time. The number of levels (n, which will be described later) herein is, for example, 10 to 20 levels, which covers an output range of the high-voltage power supply.

Determination of the "first VI characteristic" is performed in a relatively short time such as between sheets or between images during execution of a print job. Since determination of the first VI characteristic is performed in a short time, the number of levels of the voltage to be applied to the applied member is smaller than that at the time of determination of the second VI characteristic. For example, the number (m, which will be described later) of levels when the VI characteristic determiner 120 determines the first VI characteristic is one to several, and the more preferable number of levels is two or three.

First Embodiment

Figure 2:
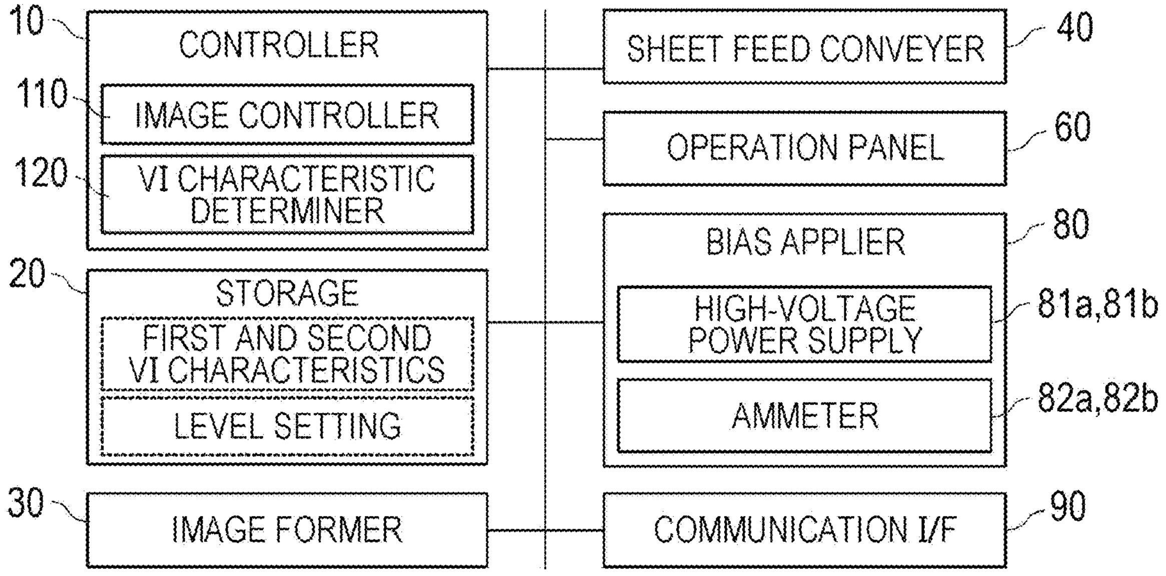
FIG. 2 is a block diagram illustrating a hardware configuration of the image forming apparatus.
Figure 3:
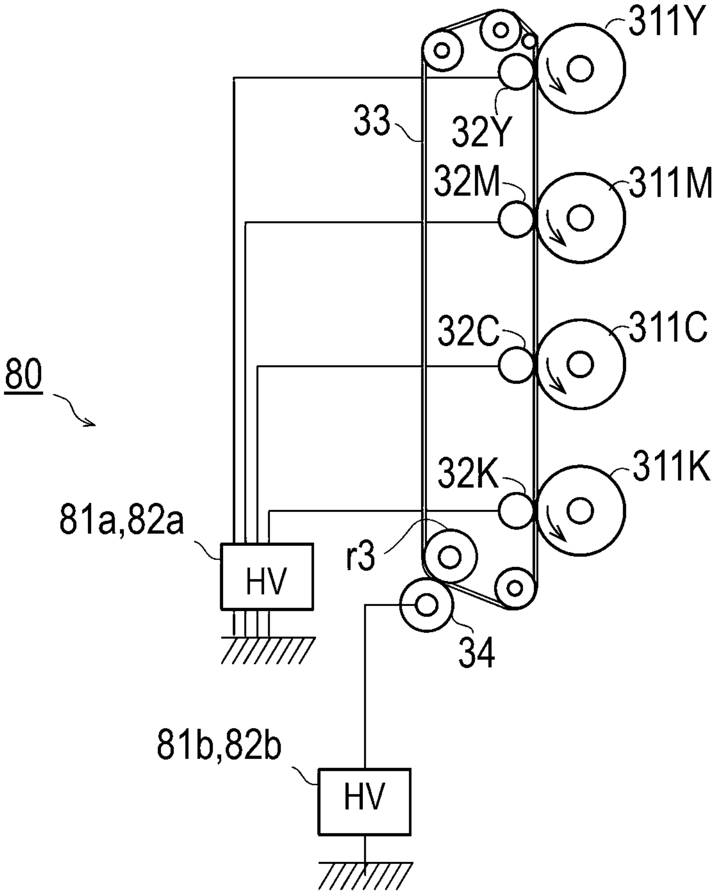
FIG. 3 is a schematic view illustrating a configuration around an image former.

FIG. 1 is a diagram illustrating a schematic configuration of the image forming apparatus 1000 according to a first embodiment. FIG. 2 is a block diagram illustrating a main hardware configuration of the image forming apparatus 1000. FIG. 3 is a diagram illustrating a configuration around an image former 30. As illustrated in FIGS. 1 and 2, the image forming apparatus 1000 includes the controller 10, a storage 20, the image former 30, a sheet feed conveyer 40, an operation panel 60, the bias applier 80, and a communication interface (I/F) 90. These are connected to each other by signal lines.

The controller (hardware processor) 10 includes a CPU, a RAM, a ROM, and the like, and performs various types of control of the entire image forming apparatus 1000 by the CPU executing a control program stored in the storage 20. Furthermore, the controller 10 functions as an image controller 110 and the VI characteristic determiner 120. Details of these functions will be described later, but an outline thereof is as follows.

When a print job is input, the image controller 110 causes the print job to be executed on the basis of print job setting information of the input print job. The print job is input in response to an instruction sent from the operation panel 60 or an external terminal such as a network-connected PC operated by the user. The image controller 110 controls sheet feed conveyance of a sheet S by controlling the sheet feed conveyer 40. In addition, the image controller 110 sets image forming conditions (also referred to as process conditions) of the image former 30 according to the setting of the print job and the VI characteristic. The image controller 110 calculates, as the image forming condition, the resistance of the transfer member from the VI characteristic, and determines, from this resistance or directly from the VI characteristic, the transfer bias setting (vt) so as to obtain a predetermined output current. The VI characteristic determiner 120 applies transfer bias outputs at a plurality of levels to the applied member (transfer member) by the high-voltage power supply 81*a* (or 81*b*). Then, the VI characteristic determiner 120 determines the first VI characteristic and the second VI characteristic (for example, FIG. 5 to be described later) according to the measurement values of an ammeter 82*a* (or 82*b*) at that time.

The storage 20 includes an auxiliary storage device including a semiconductor SSD and/or a magnetic disk. The storage 20 stores various control programs, setting values of the apparatus main body, print job settings, and image data. In addition, the first and second VI characteristics are stored in the storage 20.

(Image Former 30)

The image former 30 forms an image on the sheet S by an electrophotographic process. The image former 30 includes a plurality of image forming units 31Y, 31M, 31C, and 31K. The image forming units 31Y, 31M, 31C, and 31K correspond to basic colors of yellow (Y), magenta (M), cyan (C), and black (K), respectively. Hereinafter, these units are collectively referred to simply as image forming units 31. The same applies to the primary transfer rollers 32 described later.

The image former 30 includes the primary transfer rollers 32Y, 32M, 32C, and 32K corresponding to the respective image forming units 31, the intermediate transfer belt 33, the secondary transfer roller 34, a fixing device 35, and the like. As described above, among these, the primary transfer rollers 32Y, 32M, 32C, and 32K, the intermediate transfer belt 33, and the secondary transfer roller 34 function as applied members. In addition, the intermediate transfer belt 33 functions as an image bearing member that carries a toner image.

The image forming units 31 each include a photosensitive drum 311, a charging electrode, an exposure section, a developing device 312, a cleaner, and the like (some components are not illustrated). The image forming units 31 have the same configuration except for the color of toner of the developer stored in the developing device 312.

The photosensitive drum 311 includes, for example, an organic photoreceptor in which a photosensitive layer including a resin containing an organic photoconductor is formed on the outer peripheral surface of a drum-shaped metal base. The photosensitive drum 311 rotates counterclockwise as indicated by an arrow in FIG. 1. The surface of the photosensitive drum 311 is substantially uniformly charged by the charging electrode and is then exposed to light on a pixel-by-pixel basis by the exposure section on the basis of image data, so that an electrostatic latent image is formed on the surface the photosensitive drum 311. The electrostatic latent image is developed by the developing device 312 to form a toner image.

The developing device 312 of each image forming unit 31 includes a developing roller disposed so as to face the photosensitive drum 311. The developing devices 312 each contain a two component developer including small-particle-diameter toner having a different color of yellow, magenta, cyan, or black and a carrier.

The intermediate transfer belt 33 is rotatably stretched over a plurality of inscribed rollers including an opposing roller r3, and rotationally moves in a clockwise direction as indicated by an arrow in FIG. 1. On an inner peripheral surface side (back surface side) of the intermediate transfer belt 33, the plurality of primary transfer rollers 32 is arranged in a manner facing the photosensitive drums 311. A transfer bias is applied to the primary transfer rollers 32 by the high-voltage power supply 81*a* during transfer.

(Example of Applied Member)

The system speed (also referred to as processing speed) of the image forming apparatus 1000 is, for example, 400 mm/sec.

The intermediate transfer belt 33 includes, for example, polyimide resin, is 80 μm thick, and has a surface resistance of 9.95 to 10.75 Log Q/sq. In addition, the intermediate transfer belt 33 may have a three layer structure including a polyimide resin layer as a base material, an elastic layer, and a surface layer. The resistance of each layer has a different value. The elastic layer can include a material containing a thermoplastic elastomer (TPE) as a main component, a material containing vulcanized rubber as a main component, or a foam of a polymer material. The surface layer is a layer formed on the elastic layer, and includes, for example, an acrylic-based material.

In addition, the primary transfer roller 32 includes, for example, a Nitrile-Butadiene Rubber (NBR) sponge rubber roller and has a resistance of 6.7 to 7.1 log Ω, a hardness of Asker C 35°, an outer diameter of φ20 mm, and a pressing force of 10 N. The sponge rubber roller is formed by forming sponge rubber on a surface of a metal roller. The opposing roller r3 includes, for example, an NBR sponge rubber roller and has a resistance of 7.5 log Ω, a hardness of Asker C 30°, an outer diameter of φ38 mm, and a pressing force of 10 N. The secondary transfer roller 34 is an NBR solid roller, and has a resistance of 7.5 log Ω, a hardness of Asker C 30°, an outer diameter of 438 mm, and a pressing force of 10 N.

The fixing device 35 includes a pressure roller and a heating roller, and is controlled to a predetermined temperature by a heater inside the heating roller. By passing the sheet S through a fixing nip formed by the pressure roller and the heating roller, heating and pressurization processing is performed on the sheet S.

The sheet feed conveyer 40 includes a plurality of sheet feed trays 41 and conveyance paths 42 and 43. A plurality of sheets S is stacked on the sheet feed tray 41, and the topmost sheet S is fed one by one. The sheet feed conveyer 40 includes a plurality of conveyance roller pairs arranged along the conveyance paths 42 and 43, and a drive motor (not illustrated) for driving the conveyance roller pairs. The sheet feed conveyer 40 conveys the sheet S fed from the sheet feed tray 41 to the transfer position of the secondary transfer roller 34 or the fixing device 35 on the downstream side thereof. In double-sided printing in which an image is also formed on the back side (second side) of the sheet S, the sheet S on which an image has been formed on one side is conveyed to the conveyance path 43 for double-sided image formation in a lower portion of the apparatus main body. The sheet S conveyed to the conveyance path 43 has the front and back inverted on a switchback path and then merges into the conveyance path 42 for single-sided printing, and an image is again formed on the other surface of the sheet S by the image former 30.

The toner images formed on the photosensitive drums 311 of the image forming units 31 are sequentially primary-transferred onto the surface of the intermediate transfer belt 33 by the respective primary transfers. Thus, a superimposed toner image is formed on the intermediate transfer belt 33. The superimposed toner image on the intermediate transfer belt 33 is secondarily transferred by the secondary transfer to the sheet S conveyed in synchronization with the position of the toner image. The sheet S having the superimposed toner image transferred thereon is conveyed to the fixing device 35 on the downstream side and is heated and pressurized by the fixing device 35, so that a full-color image is formed on the sheet S.

The operation panel 60 includes a touch screen, a numeric keypad, a start button, a stop button, and the like. The operation panel 60 is used for input of various settings related to the apparatus, display of an apparatus state, and input of various instructions.

(Bias Applier 80)

The bias applier 80 includes the high-voltage power supply 81*a* that applies a transfer bias to the primary transfer roller 32, the high-voltage power supply 81*b* that applies a transfer bias to the secondary transfer roller 34, and ammeters 82*a* and 82*b* that measure currents output from the high-voltage power supplies 81*a* and 81*b*. Hereinafter, these are also collectively referred to as the high-voltage power supply 81 and the ammeter 82. The ammeter 82 also functions as a detector. The high-voltage power supply 81*a* and the ammeter 82*a* apply an independent transfer bias to each of the plurality of primary transfer rollers 32Y, 32M, 32C, and 32K, and measure a current flowing through each of the plurality of primary transfer rollers 32Y, 32M, 32C, and 32K.

The communication I/F 90 is an interface for various local connections, such as a network interface for wired communication according to a standard such as Ethernet (registered trademark) or an interface for wireless communication according to a standard such as Bluetooth (registered trademark) or IEEE802.11. The communication I/F 90 performs communication with a user terminal such as a personal computer (PC) connected to a network.

(Determination Processing for Second VI Characteristic)

Figure 4A:
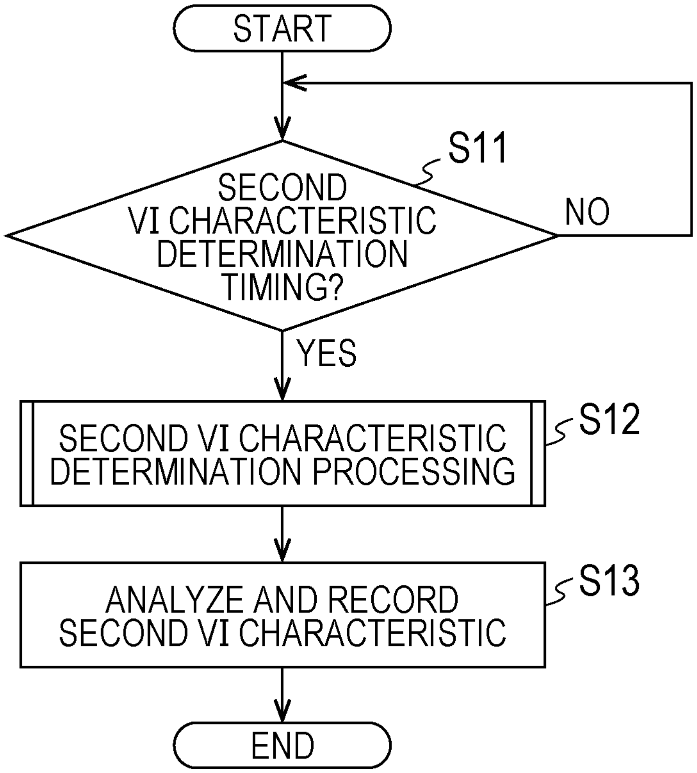
FIG. 4A is a flowchart illustrating a determination processing for a second VI characteristic.
Figure 4B:
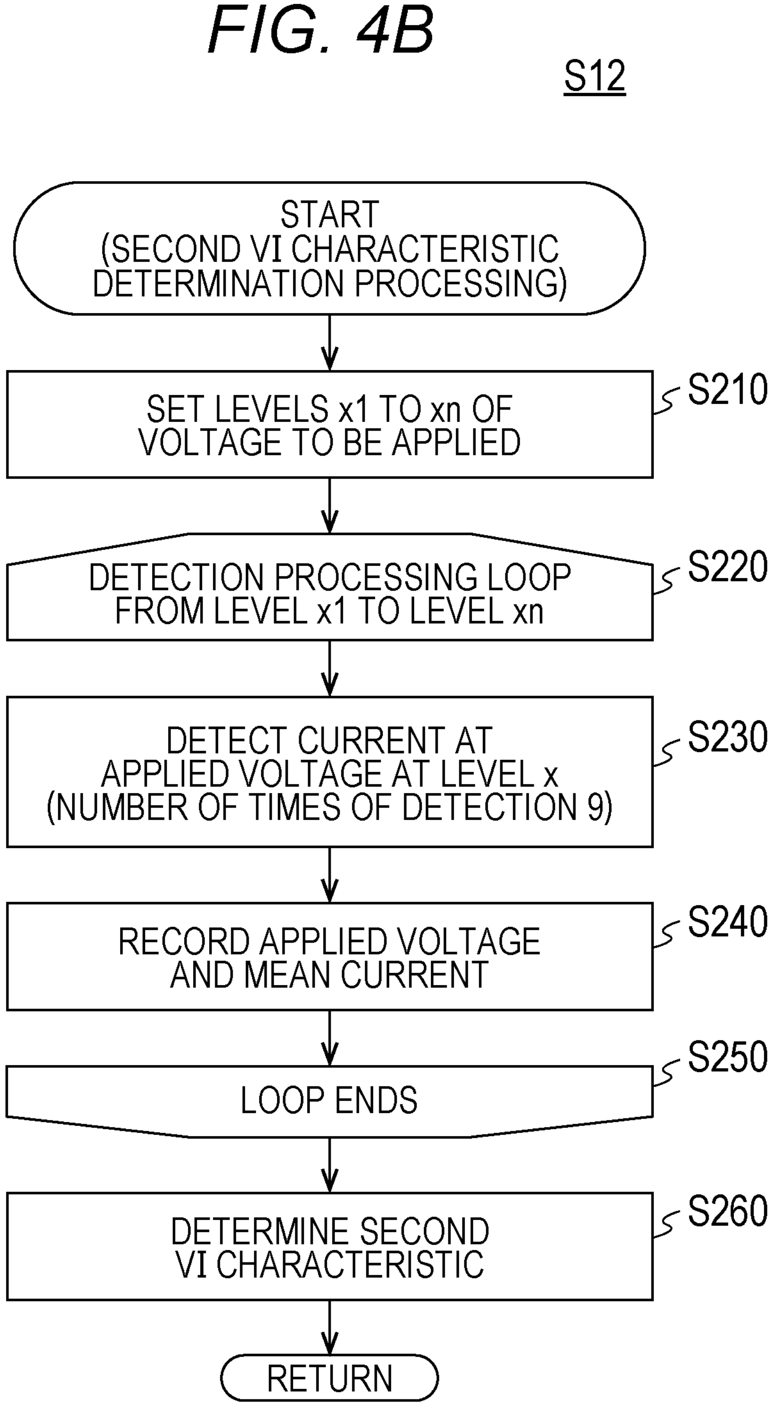
FIG. 4B is a subroutine flowchart illustrating the VI characteristic determination processing in step S12 of FIG. 4A.
Figure 5:
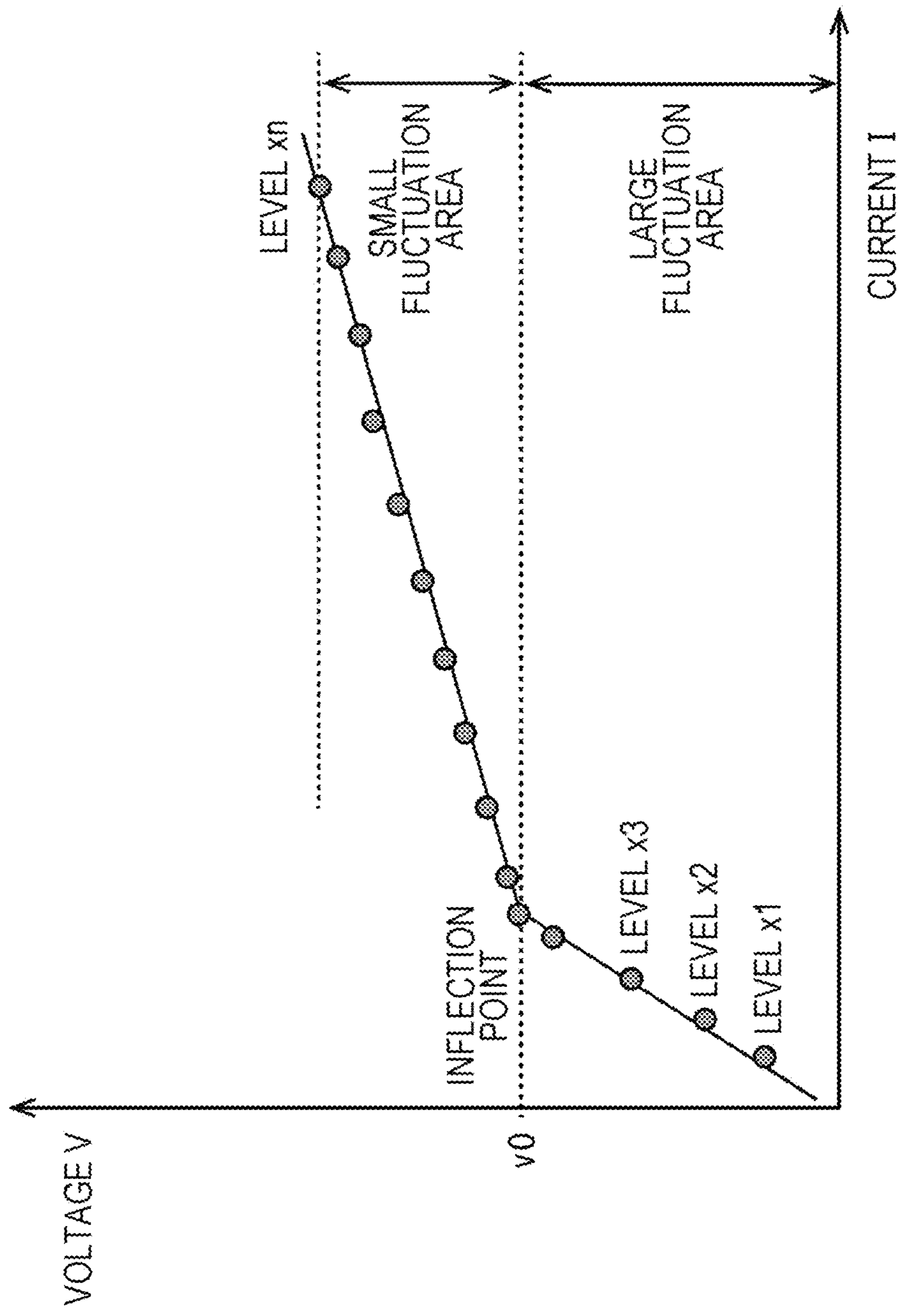
FIG. 5 is a diagram illustrating an example of the second VI characteristic obtained in FIG. 4A.

Next, determination processing for the second VI characteristic will be described with reference to FIGS. 4A, 4B, and 5. FIG. 4A is a flowchart illustrating determination processing for the second VI characteristic, and FIG. 4B is a subroutine flowchart illustrating VI characteristic determination processing in step S12 of FIG. 4A.

Hereinafter, as a representative, a description will be provided on a case where the applied member is the primary transfer roller 32K (the same applies to the processing in FIG. 6A). In this case, a transfer bias setting vt of the high-voltage power supply 81*a* that supplies a bias to the primary transfer roller 32K is controlled by processing described below. Control of the transfer bias setting for the other applied members (the primary transfer rollers 32Y, 32M, and 32C, the intermediate transfer belt 33, and the secondary transfer roller 34) is performed in parallel, but description thereof is omitted.

(Step S11)

If it is the determination timing of the second VI characteristic, the controller 10 advances the processing to step S12. As a determination condition for determining whether or not it is the determination timing, at least one of the following can be applied. For example, according to condition 3, in a case where determination processing for the second VI characteristic is executed for every predetermined number of printed sheets, the print job in execution is interrupted every time the number of sheets of the print job reaches a predetermined number, and the processing in step S12 and the subsequent steps is executed.

(Condition 1) Before (immediately before) start of execution of a print job.

(Condition 2) At the time of turning on the power of the image forming apparatus 1000.

(Condition 3) Every predetermined number of printed sheets (for example, every 1000 sheets).

(Condition 4) In a case where the second VI characteristic is not stored in the storage 20 (no history).

(Step S12)

The controller 10 executes second VI characteristic determination processing. The processing herein will be described with reference to the subroutine flowchart of FIG. 4B.

(Step S210)

The VI characteristic determiner 120 sets a plurality of levels x1 to xn of the transfer bias (voltage) to be applied. This setting is stored in the storage 20 in advance. For example, the levels are n (for example, dozen or so) level settings equally spaced from the lower limit to the upper limit of the range of use of the transfer member.

(Detection Processing Loop: Steps S220 to S250)

From step S220 to step S250, the VI characteristic determiner 120 causes the high-voltage power supply 81*a* to output a transfer bias (voltage) corresponding to the level x sequentially from the level x1 to the level xn, and applies the transfer bias to the primary transfer roller 32. Then, the VI characteristic determiner 120 causes the ammeter 82*a* to detect the current at that time. In the second VI characteristic determination processing, time restriction is less strict than in the first VI characteristic determination processing described later. Therefore, the VI characteristic determiner 120 increases the detection time or the number of times of detection in order to place importance on measurement accuracy. The VI characteristic determiner 120 performs measurement nine times as the same number of times of detection at each level x. Here, one detection time is a 2 msec, and the detection is performed nine times in a row. Therefore, a detection time in one level is 18 msec. Next, the VI characteristic determiner 120 records the mean current obtained by averaging the nine measured values in association with the output value of the transfer bias (step S240).

(Step S260)

The VI characteristic determiner 120 determines the second VI characteristic from the applied voltage and the detected current (mean current) at each level from the level x1 to xn by the processing from step S220 to step S250. FIG. 5 is an example of the determined second VI characteristic. Then, the processing in FIG. 4B ends, and the processing returns to the processing in FIG. 4A.

(Step S13)

Here, the VI characteristic determiner 120 analyzes the obtained second VI characteristic, and records (updates) the second VI characteristic in the storage 20 together with the analysis result. The VI characteristic determiner 120 performs the following as the analysis processing.

Determine if the updated second VI characteristic is non-linear.

In a case where it is determined to be non-linear, an inflection point is further recognized.

Furthermore, a large fluctuation area and a small fluctuation area are recognized according to the position of the inflection point.

In the example illustrated in FIG. 5, with the voltage v0 at the inflection point as a boundary, the area above the boundary is recognized as a small fluctuation area, and the area below the boundary is recognized as a large fluctuation area, according to the slopes before and after the boundary. The small fluctuation area and the large fluctuation area are used for the determination processing for the first VI characteristic described below. Then, the controller 10 terminates the processing of FIG. 4A (END). Note that the analysis processing in step S13 may not be performed at this timing but may be performed in FIG. 6C (step S410) described later.

(Print Processing)

Next, print processing executed by the image forming apparatus 1000 according to the present embodiment will be described with reference to FIGS. 6A to 6C and FIGS. 7 to 9.

Figures 6A, 6B:
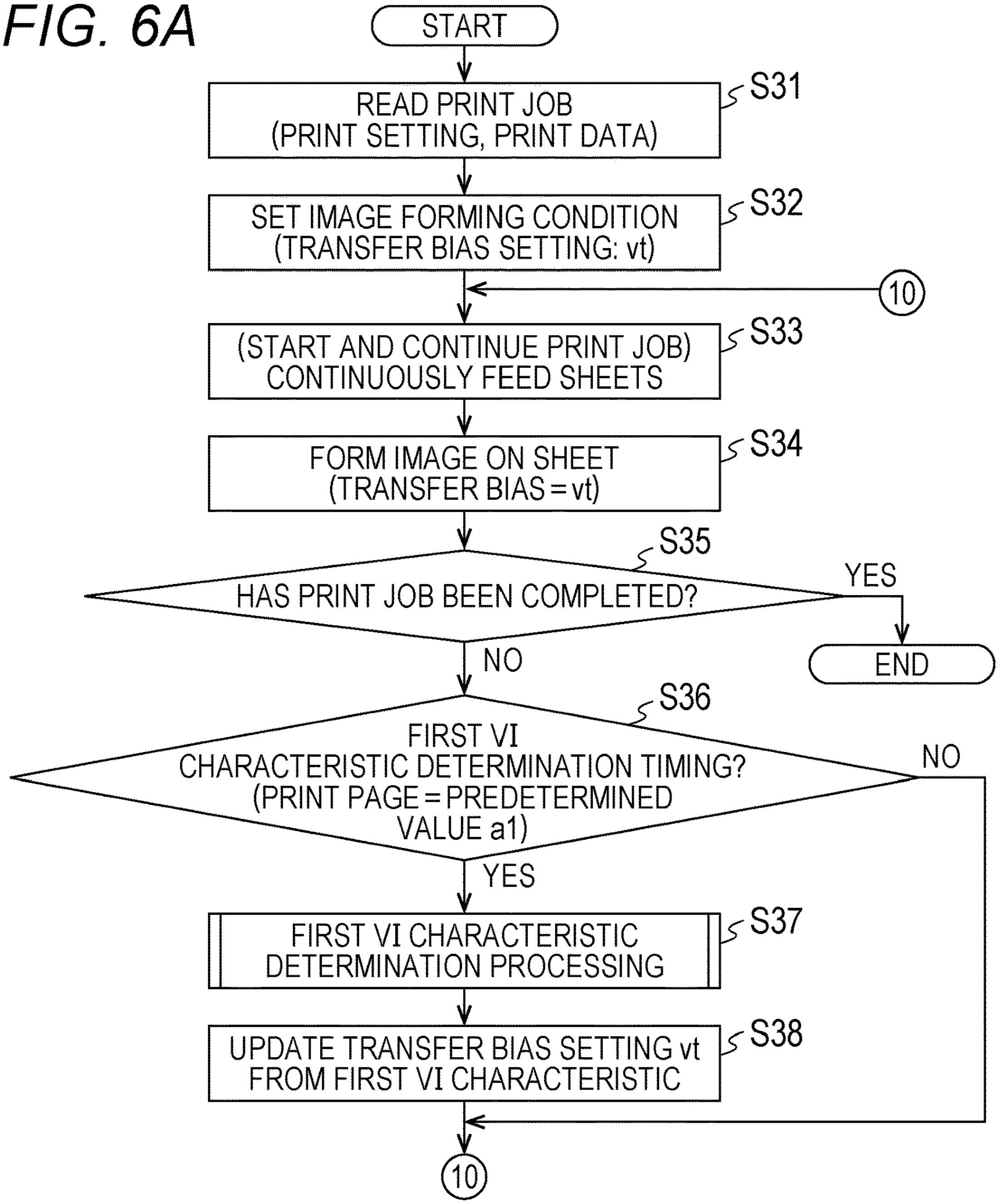
FIG. 6A is a flowchart illustrating print processing.
FIG. 6B is a table illustrating determination timings of step S36.
Figure 6C:
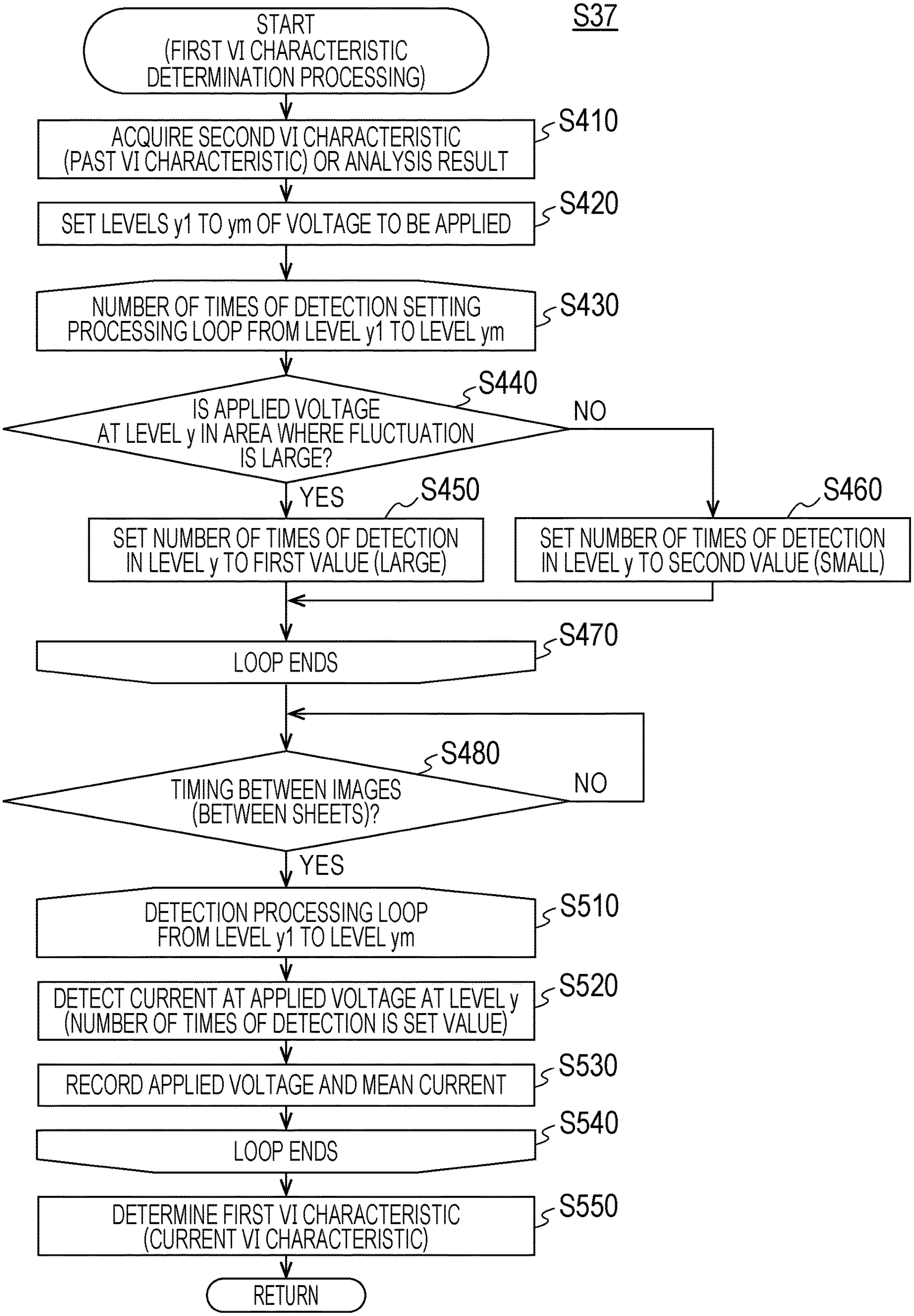
FIG. 6C is a subroutine flowchart illustrating first VI characteristic determination processing in step S37 of FIG. 6A.

FIG. 6A is a flowchart illustrating print processing. FIG. 6B is a table illustrating determination timings of step S36. FIG. 6C is a subroutine flowchart illustrating the first VI characteristic determination processing in step S37 of FIG. 6A.

(Step S31)

The controller 10 reads a print job. The print job includes print data and print setting. In the print setting, the type of sheet to be used (thin paper, thick paper, coated paper, or the like), the size, the number of sheets to be printed, and the like are described.

(Step S32)

The image controller 110 sets image forming conditions in accordance with the print setting and a machine state. The machine state includes ambient temperature and humidity of the image forming apparatus 1000, a use history (the number of used sheets and use time) of each component of the image forming unit 31, information on the type of sheet, and the like. The ambient temperature and humidity can be detected by a temperature and humidity sensor (not illustrated) installed inside the apparatus main body. These image forming conditions set by the image controller 110 include a transfer bias setting (output current value) for the transfer member. The image controller 110 refers to the second VI characteristic stored in the storage 20, calculates a voltage at which a predetermined output current value set in the image forming conditions is obtained, and sets the calculated voltage as the transfer bias setting. The predetermined output current value is used in common during execution of one print job. In the following, similarly to FIG. 4A, the transfer bias setting vt by the high-voltage power supply 81*a* for the primary transfer roller 32K as a representative of the applied member will be described.

Note that in a case where the determination condition of the second VI characteristic is set to the above-described "condition 1": immediately before start of execution of the print job, the determination processing for the second VI characteristic illustrated in FIG. 4A is executed between steps S31 and S32. Then, the image forming condition setting in step S32 is performed by using the latest second VI characteristic determined and recorded.

(Steps S33 and S34)

The image controller 110 controls the sheet feed conveyer 40 to continuously feed and convey the sheets S. Furthermore, the image controller 110 controls the image former 30 to form an image on the conveyed sheet S under the image forming conditions set in step S32.

(Step S35)

If the number of printed sheets set in the print setting has been reached and the print job has been completed (YES), the controller 10 ends the processing. On the other hand, if the number of printed sheets has not been reached (NO), the controller 10 advances the processing to step S36.

(Step S36)

The controller 10 determines whether it is a first VI characteristic determination timing. FIG. 6B is an example of a table of determination timings stored in the storage 20. FIG. 6B indicates the number of prints p (the number of pages) from the start of the print job. In the example of FIG. 6B, the first determination is made at 5 p, and thereafter, the determination is made at every 30 p. This determination timing is an example, and is not limited thereto. For example, the table illustrated in FIG. 6B may be of multiple types, and each of the tables may be selected as appropriate by a user's instruction via the operation panel 60 or the like. For example, two tables may be provided for color printing and monochrome printing, the table in FIG. 6B may be applied to color printing, and the other table in which the frequency is lower than (for example, half of) that in the color printing may be prepared.

Referring to FIG. 6B, if the controller 10 determines that it is the first VI characteristic determination timing (YES), the controller 10 advances the processing to step S37. In the case of determining that it is not the determination timing (NO), the controller 10 returns the processing to step S33 and repeats the subsequent processing.

(Step S37)

The controller 10 executes the first VI characteristic determination processing. The processing here will be described with reference to the subroutine flowchart of FIG. 6C.

(Step S410)

The controller 10 acquires the second VI characteristic stored in the storage 20. In addition, the VI characteristic determiner 120 performs analysis processing by using the acquired second VI characteristic and recognizes a large fluctuation area and a small fluctuation area. Note that this analysis processing may be performed together when the second VI characteristic is determined, and in this case, only the analysis result may be acquired in step S410.

(Step S420)

The VI characteristic determiner 120 sets a plurality of levels y1 to ym of the transfer bias (voltage) to be applied. The number m of levels is one to several, and preferably two or three. In the following description, it is assumed that m=3 and the number of levels y is three, that is, y1 to y3. The output setting at each level y is determined on the basis of on the current transfer bias setting vt, that is, the transfer bias vt output during the immediately preceding image formation. In this case, the current transfer bias setting vt is used as a reference, a level obtained by multiplying the current transfer bias vt by a predetermined ratio (equal ratio) may be set, or the predetermined ratio may be added or subtracted (equal difference). For example, in the case of setting to a level multiplied by a predetermined ratio, the current transfer bias setting vt is set as the level y1, and 0.75 times and 0.50 times thereof are set as the levels y2 and y3, respectively. This ratio is merely an example, and may be set to 1.2 times and 0.83 times, or may be set to 1.5 times and 0.67 times. Hereinafter, the description will be provided assuming that the levels y1, y2, and y3 are set to 1.0 times (the same), 0.75 times, and 0.50 times the current transfer bias setting, respectively.

(Number of Times of Detection Setting Processing Loop: Steps S430 to S470)

From the step S430 to the step S470, the VI characteristic determiner 120 sets the number of times of detection according to the value of the transfer bias (voltage) of the level y sequentially from the level y1 to the level ym. To be specific, in step S440, the VI characteristic determiner 120 determines whether the value of the level y1 belongs to an area where the fluctuation is large or an area where the fluctuation is small. In the example illustrated in FIG. 5, if the value of the level y (each of the levels y1 to y3) is equal to or smaller than the voltage v0 at the inflection point, the VI characteristic determiner 120 determines that the value of the level y is in the area where the fluctuation is large, and sets the number of times of detection to a first value (a large number of times). On the other hand, if the value of the level y is larger than the voltage v0, the VI characteristic determiner 120 determines that the value of the level y is in the area where the fluctuation is small, and sets the number of times of detection to a second value (a small number of times). The first value is greater than the second value, for example, the first value is nine times, and the second value is three times. At the time of VI detection described later, the VI characteristic determiner 120 performs current detection for the set number of times of detection and performs averaging processing, thereby obtaining an output current. The measurement time for one detection is the same, and is, for example, 2 msec. For example, in a case where the number of times of detection is set to two, the total measurement time is 4 msec. In a case where the number of times of detection is set to nine, the total measurement time is 18 msec.

The reason why the number of times of detection is increased in the area where the fluctuation is large is that since the fluctuation at the time of measurement is large, the number of times of detection is increased in order to increase the detection accuracy. On the other hand, the reason why the number of times of detection is reduced in the area where the fluctuation is small is that since the fluctuation at the time of measurement is small, a certain degree of detection accuracy can be maintained even if the number of times of detection is reduced, and the detection time is shortened to secure productivity. Note that although the example in which the number of times of detection is set according to whether the area to which the level belongs is the area where the fluctuation is large or the area where the fluctuation is small has been described here, the present invention is not limited thereto. The VI characteristic determiner 120 may set a detection time instead of the number of times of detection.

(Step S480)

If it is the timing between images or between sheets, the controller 10 advances the processing to step S510.

(Detection Processing Loop: Steps S510 to S540)

From step S510 to step S540, the VI characteristic determiner 120 causes the high-voltage power supply 81*a* to output and apply to the primary transfer roller 32 the transfer bias (voltage) corresponding to the level y sequentially from the level y1 to the level ym. Then, the VI characteristic determiner 120 causes the ammeter 82*a* to detect the current at that time. The number of times of detection at this time is the number of times of detection set in steps S430 to S470. Since the detection is performed between sheets, in the first VI characteristic determination processing, time restriction is stricter than in the second VI characteristic determination processing. Therefore, the VI characteristic determiner 120 performs the detection a set number of times, thereby shortening the detection time while ensuring the detection accuracy. Next, the VI characteristic determiner 120 records the mean current obtained by averaging the measured values of detection performed the set number of times in association with the output value of the transfer bias (step S530).

Figure 7:
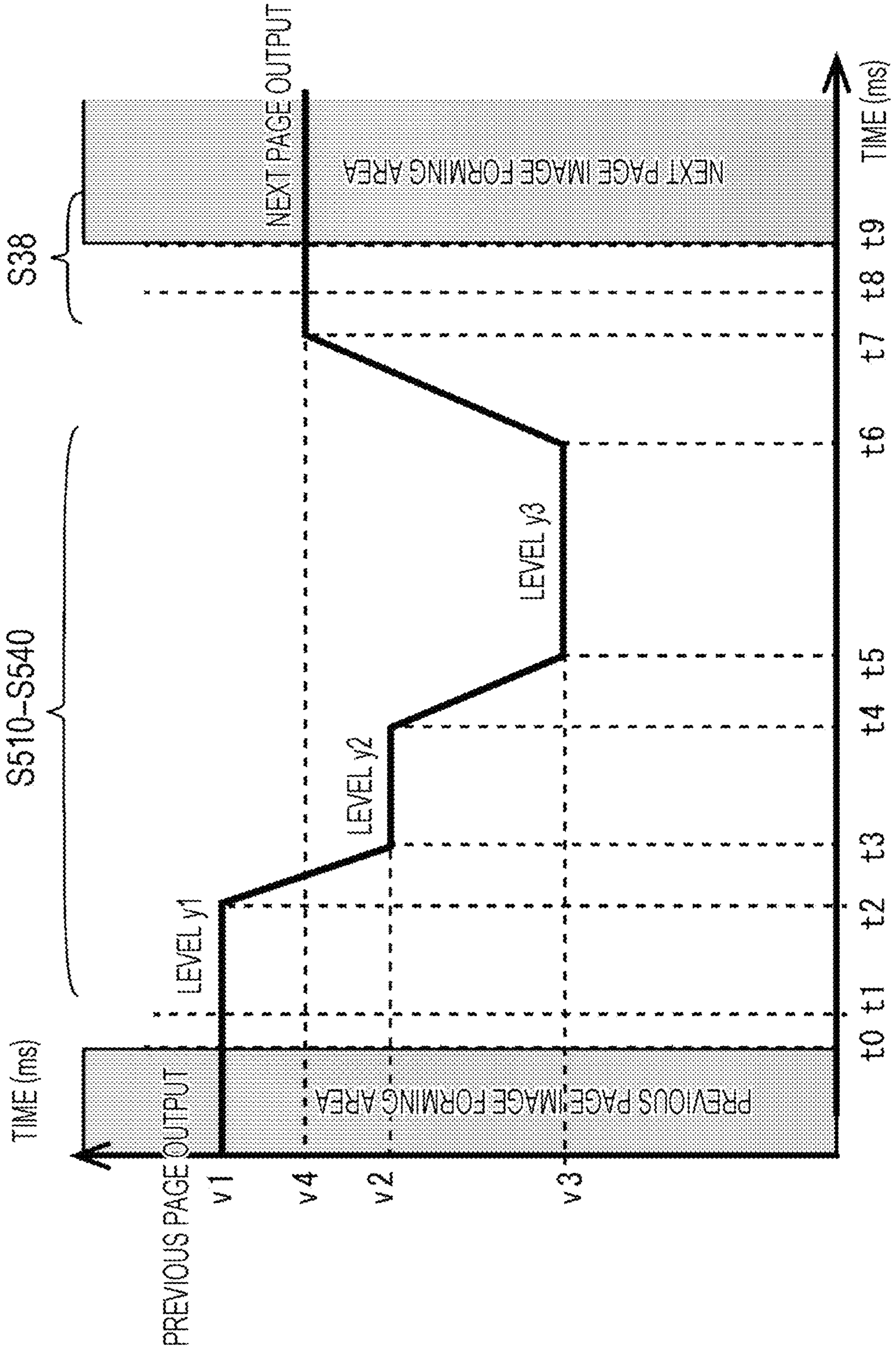
FIG. 7 is a schematic diagram illustrating VI detection performed between sheets.

FIG. 7 is a schematic diagram illustrating VI detection performed between sheets. In FIG. 7, the horizontal axis represents time, and the vertical axis represents the output of the transfer bias (voltage). The area before time t0 is the image forming area of the previous page, and the area after time t9 is the image forming area of the next page. The period from time t0 to time t9 corresponds to an interval between images or an interval between sheets. The duration from time t0 to time t9 is 50 to 100 msec, for example, 80 msec. The area from time t0 to time t1 and the area from time t8 to time t9 are work prohibition areas. Periods from time t0 to time t1, from time t3 to time t4, and from time t5 to time t6 are periods in which the transfer biases at the levels y1, y2, and y3 are applied, respectively. The following description will be given assuming that the switching time between adjacent detections is almost zero and can be ignored and the length of the applied period is the same as the detection time. In the example illustrated in FIG. 7, in the levels y1 and y2, the number of times of detection is set to the second value (for example, two times, 4 msec in total) in step S460. In addition, in the level y3, the number of times of detection is set to the first value (for example, nine times, 18 sec in total) in step S450. The level y1 is the same voltage v1 as the transfer bias setting (v1) for the previous page. The voltage v2 of the level y2 is 0.75 times the voltage v1, and the voltage v3 of the level 3 is 0.50 times the voltage v1. This ratio is stored in the storage 20 in advance. The periods from time t2 to time t3 and from time t4 to time t5 are transition periods of the transfer bias output.

As illustrated in FIG. 7, since the applied voltage v3 of the level y3 belongs to the area where the fluctuation is large, the output period and the measurement time are set to be long. On the other hand, since the applied voltages v1 and v2 of the other levels y1 and y2 belong to the area where the fluctuation is small, the output period and the measurement time are set to be short.

(Step S550)

Figure 8:
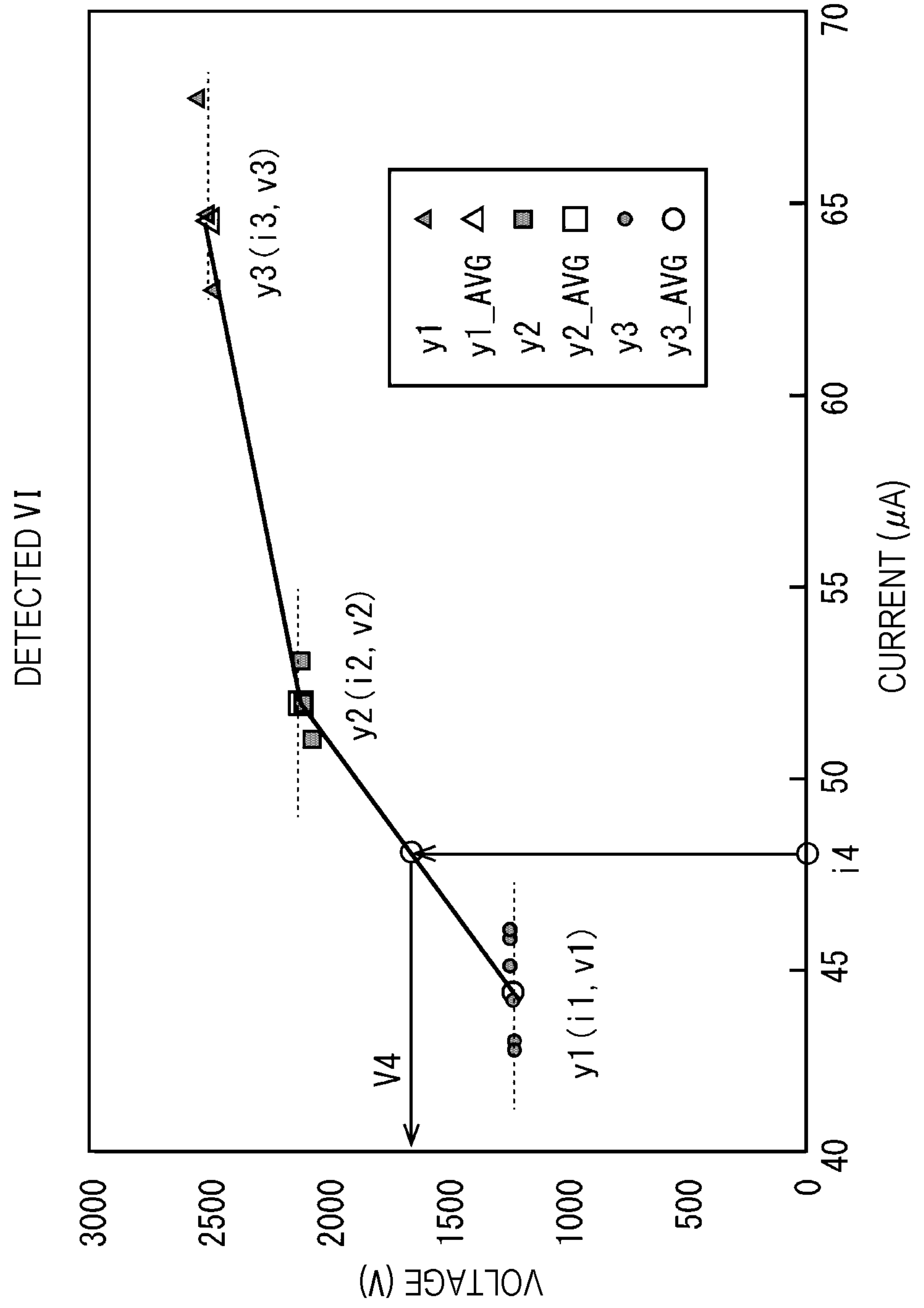
FIG. 8 is a diagram for explaining calculation of transfer output setting vt based on a first VI detection characteristic.
Figure 9:
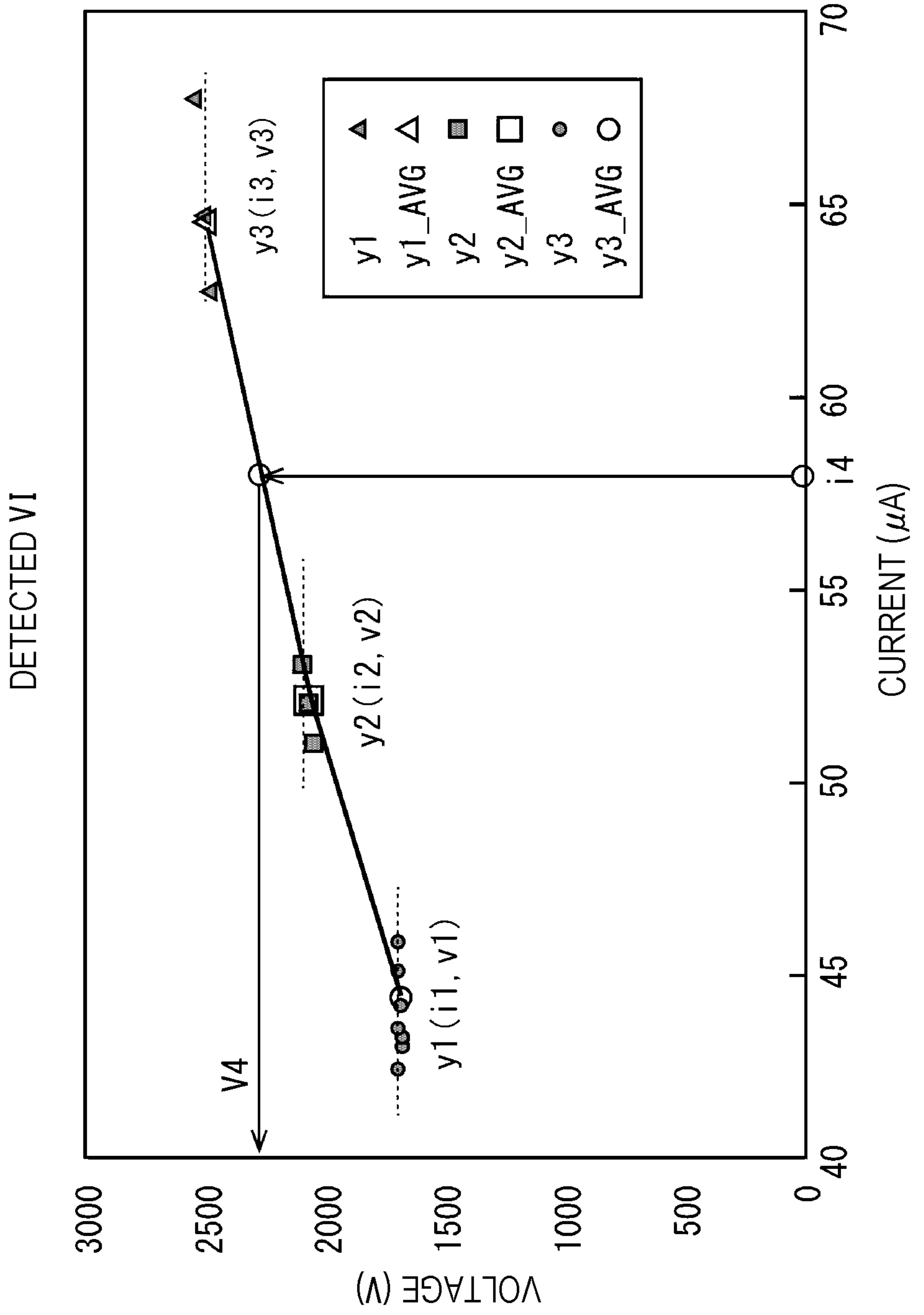
FIG. 9 is a diagram for explaining calculation of transfer output setting vt based on a first VI detection characteristic.

The VI characteristic determiner 120 determines the first VI characteristic from the applied voltage and the detected current (average current) at each level from the level y1 to the level ym by the processing from step S510 to step S540. FIG. 8 is an example of the determined first VI characteristic. In addition, FIG. 9 is another example of the determined first VI characteristic. Then, the controller 10 ends the processing in FIG. 6C and returns to the processing in FIG. 6A.

(Step S38)

Here, the VI characteristic determiner 120 updates the transfer bias setting vt from the obtained first VI characteristic in a procedure described below, and repeats the processing in step S33 and subsequent steps. In step S34 of performing image formation of the next page, the VI characteristic determiner 120 performs image formation with the updated transfer bias setting vt.

(Procedure for Updating Transfer Bias Setting Vt)

In the examples of FIGS. 8 and 9, the mean values i1, i2, and i3 of the levels y1, y2, and y3 are plotted, and two adjacent plots are connected by a straight line. As illustrated in FIG. 8, if the predetermined output current value i4 set under the image forming conditions of step S32 is between i1 and i2, the VI characteristic determiner 120 calculates the voltage value v4 when i4 flows from the straight line calculated from the two points of; (i1, v1); and (i2, v2). The voltage value v4 is the updated transfer bias setting vt. Furthermore, as illustrated in FIG. 9, if the predetermined output current value i4 set in the image forming conditions of the step S32 is between i2 and i3, the VI characteristic determiner 120 calculates the voltage value v4 when i4 flows from the straight line calculated from the two points of; (i2, v2) and (i3, v3). The transfer bias setting vt (=v4) calculated in this manner is reflected as an image forming condition at the time of image formation of the next page. In the example illustrated in FIG. 7, after time t7 between images, the transfer bias is changed to the updated transfer bias setting vt (v4) and applied.

As described above, in the present embodiment, the image forming apparatus includes the controller that determines the first voltage-current characteristic of the applied member by the detected current when the voltage at one or more levels is applied. According to the level of the voltage to be applied, the controller controls the detection time or the number of times of detection for detecting the detected current by applying the voltage at the level. Alternatively, as another embodiment, the image forming apparatus includes, the hardware controller that uses a constant current power supply and a voltmeter as the bias applier 80 to determine the first voltage-current characteristic of the applied member by a detected voltage when a current at one or more levels is applied. According to the level of the current to be applied, the controller controls the detection time or the number of times of detection for detecting the detected voltage by applying the current at the level. In this manner, the VI characteristic can be accurately determined in a short time even in a case where the detection time is limited, such as between images, in the present embodiment and the other embodiment.

Modification Example

Figure 10:
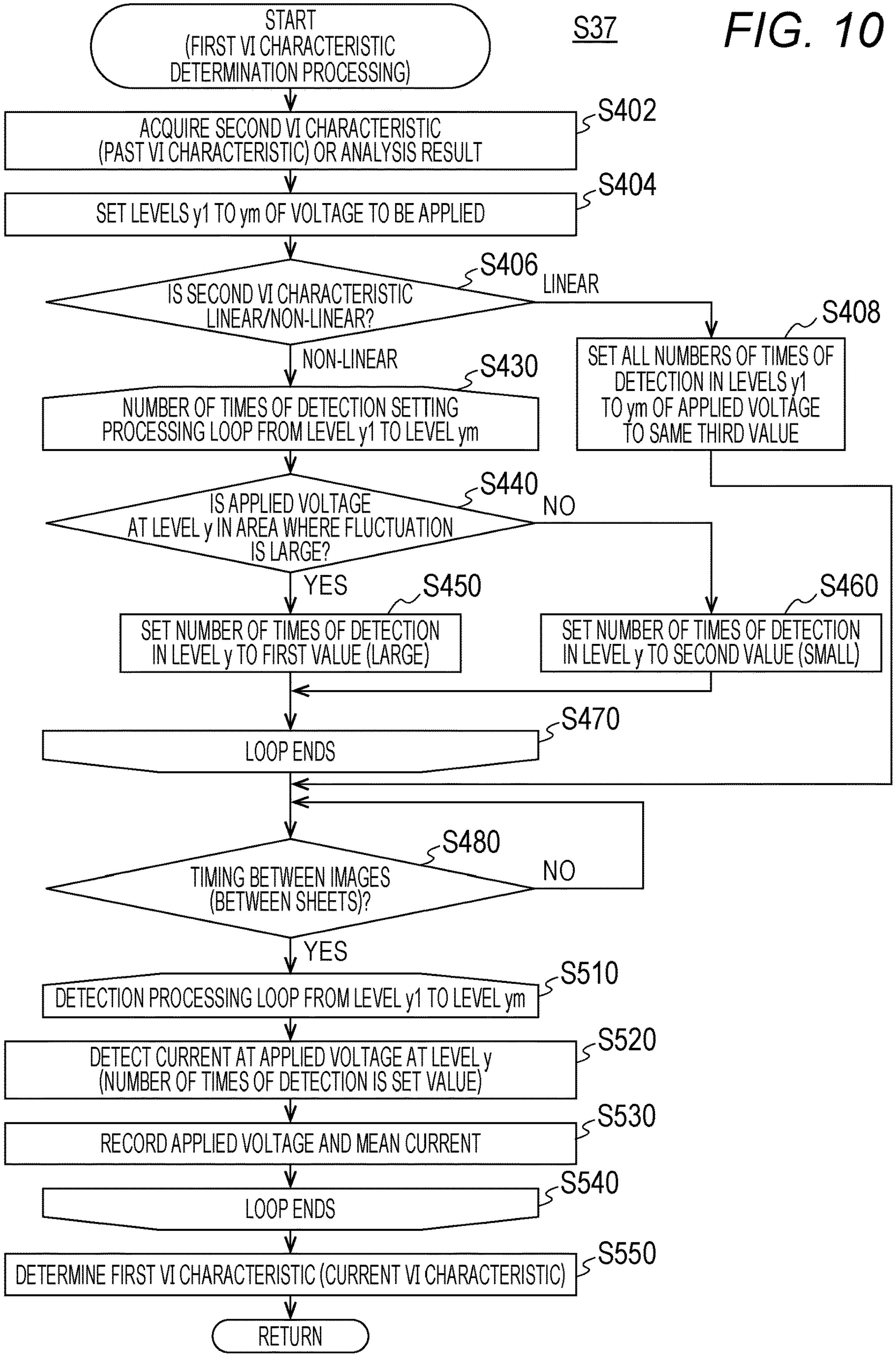
FIG. 10 is a subroutine flowchart illustrating the VI characteristic determination processing in step S37 in FIG. 6A in a modification example.

FIG. 10 is a subroutine flowchart illustrating the VI characteristic determination processing of step S37 in FIG. 6A in a modification example. In the modification example, the configuration other than the processing illustrated in FIG. 10 is the same as that of the first embodiment described with reference to FIGS. 1 to 6A, and description thereof will be omitted.

(Steps S402 to S404)

Steps S402 and S404 are the same as steps S410 and S420 in FIG. 6C, and description thereof will be omitted.

(Step S406)

The VI characteristic determiner 120 determines whether the second VI characteristic acquired in step S402 is non-linear or linear. For example, the VI characteristic determiner 120 calculates a coefficient of determination (a square value of a correlation coefficient r) with a linear function of the detection data at a plurality of levels. In a case where the coefficient of determination is close to 1 (for example, 0.8 or more), the VI characteristic determiner 120 determines that the second VI characteristic is linear, and in a case where the coefficient of determination is low (less than 0.8), the VI characteristic determiner 120 determines that the second VI characteristic is non-linear. In a case where the VI characteristic determiner 120 determines that the second VI characteristic is non-linear, the processing proceeds to step S430. On the other hand, in a case where the VI characteristic determiner 120 determines that the second VI characteristic is linear, the processing proceeds to step S408.

(Step S408)

The VI characteristic determiner 120 sets all the numbers of times of detection at the levels y1 to ym to the same third value. For example, the third value is the number of times between the first value and the second value.

(Steps S430 to S550)

The processing here is the same as that in steps S430 to S550 in FIG. 6C, and the description thereof will be omitted. In the number of times of detection setting processing loop in steps S430 to S470, in a case where the second VI characteristic is non-linear, the VI characteristic determiner 120 allocate a large number of times of detection to the level y in a case where the output of the level y is in an area where the fluctuation is large. In addition, in a case where the second VI characteristic is non-linear, the VI characteristic determiner 120 allocates a small number of times of detection to the level y in a case where the output at the level y is in an area where the fluctuation is small.

Another Modification Example

Regarding the configuration of the image forming apparatus 1000 described above, the main configuration has been described in describing the features of the above-described embodiment. The present invention is not limited to the above-described configuration and can be variously modified within the scope of the claims. In addition, a configuration included in a general image forming apparatus is not excluded.

For example, in a case where the time between images (between sheets) is short and the number of times of detection and the detection time in the levels y1 to ym are not allocated to one interval between images, they may be divided and allocated to two or more intervals between images. For example, in a case where the number of times of detection and the detection time in the levels 1 to 3 are divided into two intervals between images, the VI characteristic determiner 120 performs detection at the level 3 in the first interval between the images of 30p and 31p, performs detection at the level 1 and the level 2 in the next second interval between the images of 31p and 32p, and determines the first VI characteristic. Next, on 32p, image formation is performed with the transfer bias setting vt (v4) updated on the basis of the first VI characteristic.

The means and method for performing various types of processing in the image forming apparatus according to the present embodiment described above can be implemented by either a dedicated hardware circuit or a programmed computer. For example, the program may be provided by a computer-readable recording medium such as a USB memory or a digital versatile disc (DVD)-ROM, or may be provided online via a network such as the Internet. In this case, the control program recorded on the computer-readable recording medium is usually transferred to and stored in a storage such as a hard disk.

Although the embodiments of the present invention have been described and illustrated in detail, the disclosed embodiments have been created for purposes of illustration and example only, and not limitation. The scope of the present invention should be interpreted by the wording of the accompanying claims.

What is claimed is:

1. An image forming apparatus forming an image by an electrophotographic process, the image forming apparatus comprising:

an applied member to which a bias is applied;

an applier that applies a voltage or a current to the applied member;

a detector that detects a detected current or a detected voltage obtained through the applied member when the applier applies the bias to the applied member; and a hardware processor that determines a first voltage-current characteristic of the applied member on a basis of the detected current or the detected voltage detected by the detector when the applier applies the bias at one or more predetermined levels, the hardware processor controlling a detection time or a number of times of detection for detecting the detected current or the detected voltage at each of the one or more levels according to a value of the bias at the each of the one or more predetermined levels.

2. The image forming apparatus according to claim 1, wherein a second voltage-current characteristic of the applied member in a past obtained from detected currents or detected voltages when biases at a plurality of levels are applied is recorded, and the hardware processor determines, on a basis of the second voltage-current characteristic, whether a value of the bias applied by the applier is in an area where fluctuation of a detected current or a detected voltage is large with respect to fluctuation of the bias, and increases the detection time or the number of times of detection in the area where the fluctuation is large.

3. The image forming apparatus according to claim 2, wherein when the first voltage-current characteristic is determined, application of the bias at the one or more levels by the applier and detection of the detected current or the detected voltage are performed between sheets or between images in a print job.

4. The image forming apparatus according to claim 2, wherein the second voltage-current characteristic is obtained by applying the biases at a plurality of levels and detecting detected currents or detected voltages before starting execution of a print job or after interrupting a print job being executed.

5. The image forming apparatus according to claim 2, wherein in a case where the second voltage-current characteristic is linear, the detection time or the number of times of detection is set to be same for any of the plurality of levels.

6. The image forming apparatus according to claim 2, wherein in a case where the second voltage-current characteristic is non-linear, the hardware processor increases the detection time or the number of times of detection in a case where a value of the bias applied by the applier is in an area where fluctuation of a detected current or a detected voltage is large with respect to fluctuation of the bias.

7. The image forming apparatus according to claim 2, wherein in a case where the second voltage-current characteristic is non-linear, the hardware processor shortens the detection time or reduces the number of times of detection in a case where a value of the bias applied by the applier is in an area where fluctuation of a detected current or a detected voltage is small with respect to fluctuation of the bias.

8. The image forming apparatus according to claim 2,
wherein when the first voltage-current characteristic is determined, application of the bias at the one or more levels by the applier and detection of the detected current or the detected voltage are performed between sheets or between images in a print job, and
the one or more levels are set on a basis of a value of a bias applied to the applied member in immediately preceding image formation.

9. The image forming apparatus according to claim 1, wherein the applied member includes a plurality of layers having different layer resistances.

10. The image forming apparatus according to claim 1, wherein the applied member is an intermediate transfer belt to which a toner image developed on a photosensitive drum is transferred or a primary transfer member.

11. The image forming apparatus according to claim 1, wherein the applied member is a transfer member that transfers a toner image onto a recording medium from an image bearing member that carries the toner image.

12. A determination method of a voltage-current characteristic of an applied member, the determination method being executed in an image forming apparatus that forms an image by an electrophotographic process, the image forming apparatus including:
the applied member to which a bias is applied;
an applier that applies a voltage or a current to the applied member;
a detector that detects a detected current or a detected voltage obtained through the applied member when the applier applies the bias to the applied member, the determination method comprising:
a step (a) of determining a first voltage-current characteristic of the applied member on a basis of the detected current or the detected voltage detected by the detector when the applier applies the bias at one or more predetermined levels,
wherein in the step (a), a detection time or a number of times of detection for detecting the detected current or the detected voltage at each of the one or more levels is controlled according to a value of the bias at the each of the one or more predetermined levels.

13. A non-transitory recording medium storing a computer-readable control program to be executed on an image forming apparatus that forms an image by an electrophotographic process, the image forming apparatus including:
an applied member to which a bias is applied;
an applier that applies a voltage or a current to the applied member; and
a detector that detects a detected current or a detected voltage obtained through the applied member when the applier applies the bias to the applied member,
the computer-readable control program causing a process to be executed, the process comprising:
a step (a) of determining a first voltage-current characteristic of the applied member on a basis of the detected current or the detected voltage detected by the detector when the applier applies the bias at one or more predetermined levels,
wherein in the step (a), a detection time or a number of times of detection for detecting the detected current or the detected voltage at each of the one or more levels is controlled according to a value of the bias at the each of the one or more predetermined levels.

* * * * *